Patented Nov. 2, 1943

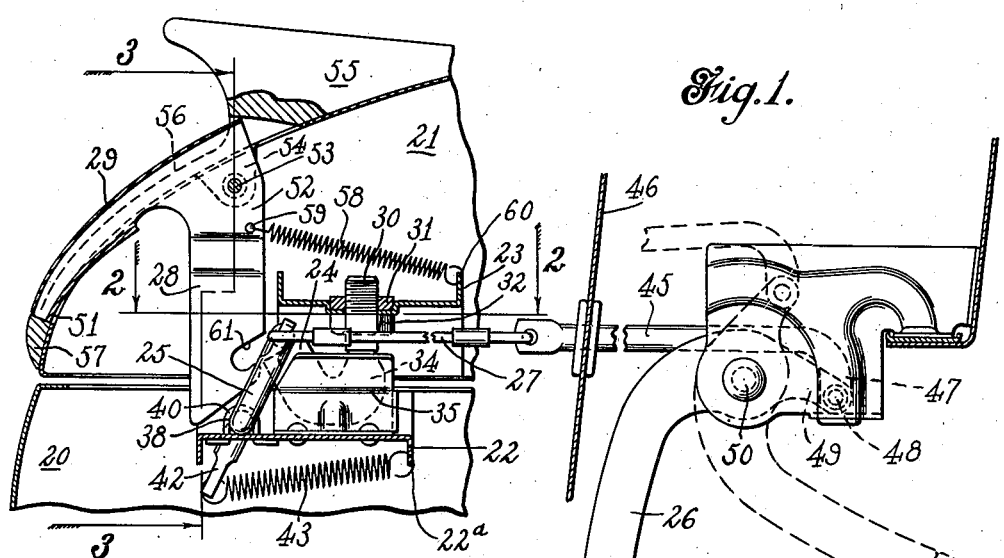
Nov. 2, 1943.     A. CLAUD-MANTLE     2,333,466
HOOD CONTROL FOR MOTOR CARS
Filed March 6, 1941     4 Sheets-Sheet 1
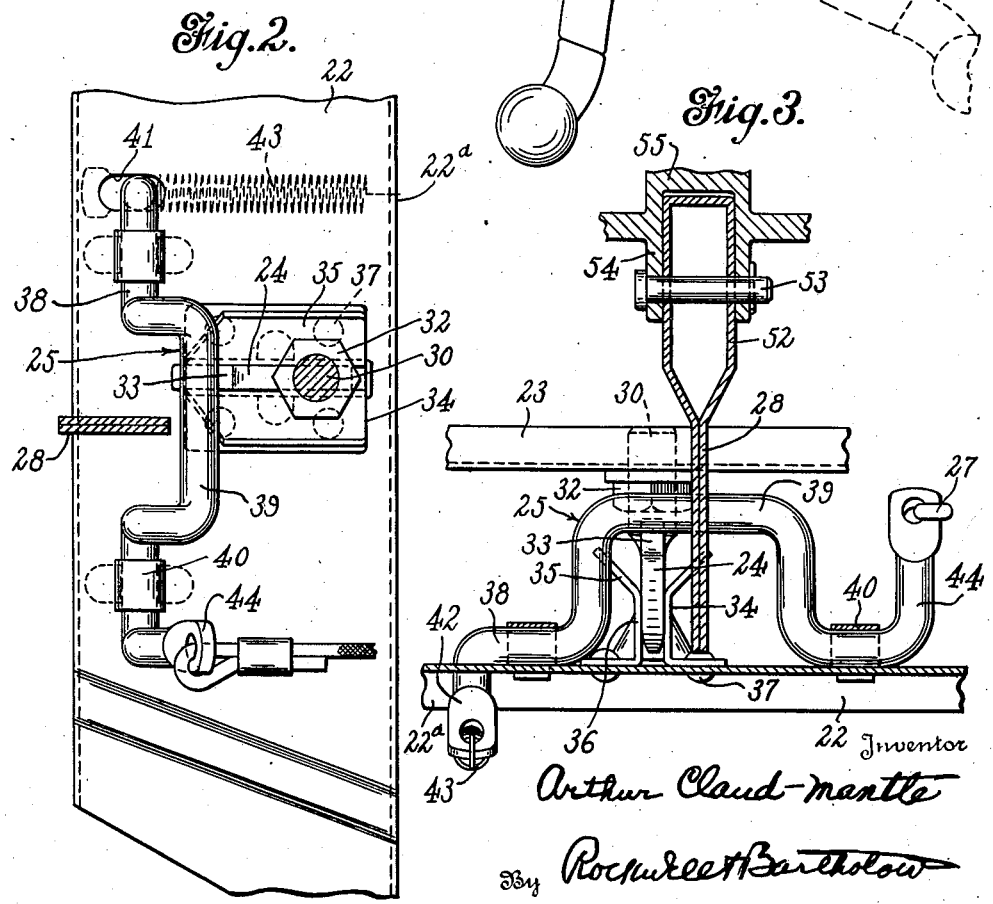
Inventor
Arthur Claud-Mantle
By Rockwell Bartholow
Attorneys

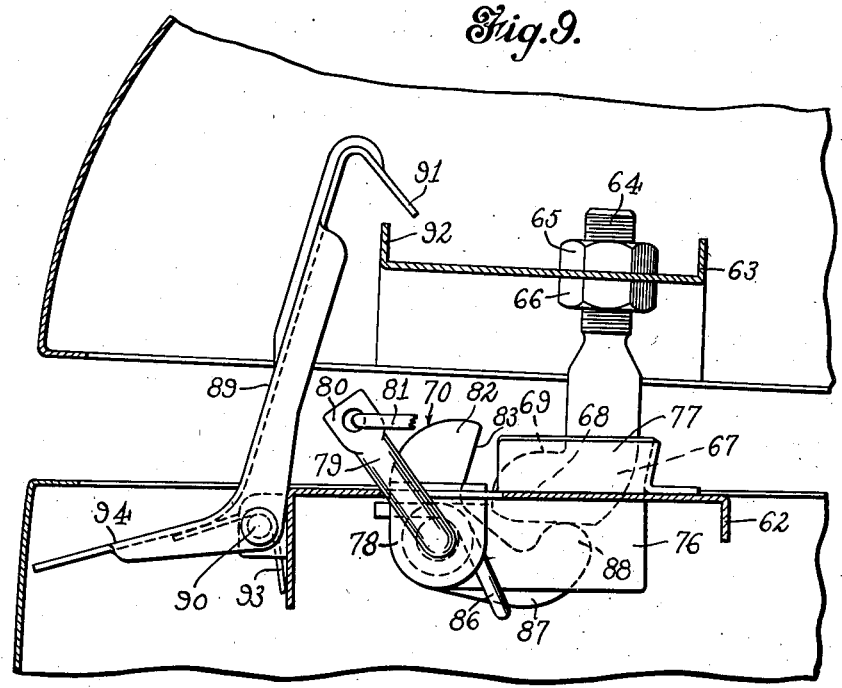
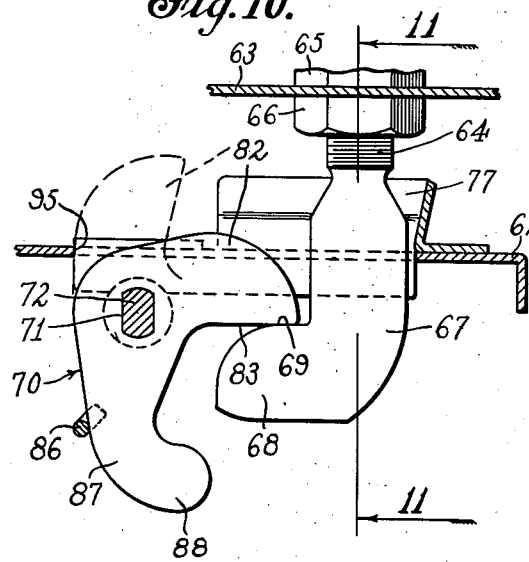
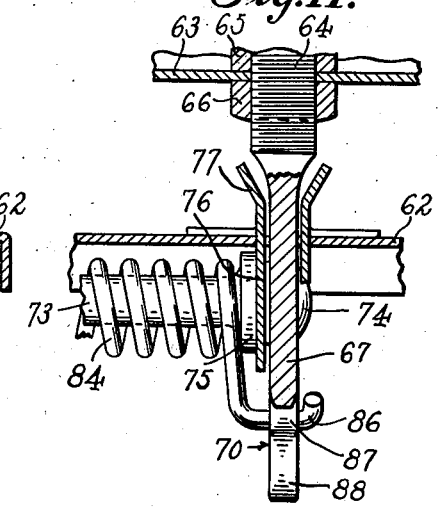

2,333,466

UNITED STATES PATENT OFFICE 2,333,466

HOOD CONTROL FOR MOTOR CARS

Arthur Claud-Mantle, Trumbull, Conn., assignor to The Bassick Company, Bridgeport, Conn., a corporation of Connecticut Application March 6, 1941, Serial No. 381,983

18 Claims. (Cl. 292—11)

This invention relates to hood control devices for motor cars, and although not limited in that respect in all aspects of the invention, it has particular reference to hoods of the lid type which are liftable from the front end of the car, there being mechanism concealed within the hood for latching it in the closed position, and there being mechanism operable from the driver's seat whereby the hood can be released preparatory to being opened up by the filling station attendant.

One of the objects of my invention is to provide an improved and simplified device of this general type.

Another object is to provide means of an effective and satisfactory character whereby the fact that the hood latch has been released by the car driver, through the manipulation of means accessible within the car, will be indicated to the attendant, so that he will know that service such as checking the oil or filling the radiator is desired.

Another purpose which I have in view is the provision of improved hood latching means manipulable from the interior of the car.

To these and other ends the invention consists in the novel features and combinations of parts to be hereinafter described and claimed.

In the accompanying drawings:

Fig. 1 is a side elevation partly in section and with certain parts broken away, showing the hood latch and the means for controlling the same from the car interior, the hood being in the closed and latched position;

Fig. 2 is an enlarged section on line 2—2 of Fig. 1, showing a portion of the lower or fixed supporting plate and its associated parts;

Fig. 3 is an enlarged section on line 3—3 of Fig. 1;

Figure 6:
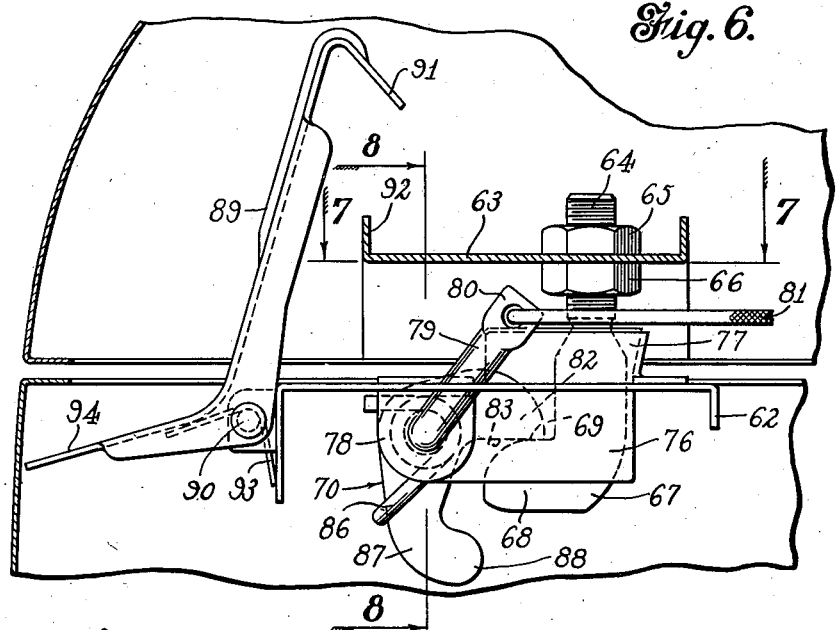
Fig. 6 is a sectional view showing a modified form of the device, the hood being in closed position.
Figure 7:
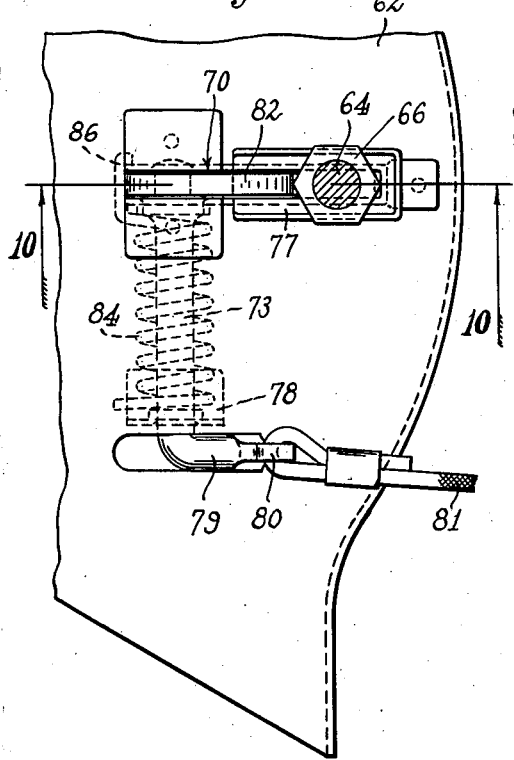
Figure 8:
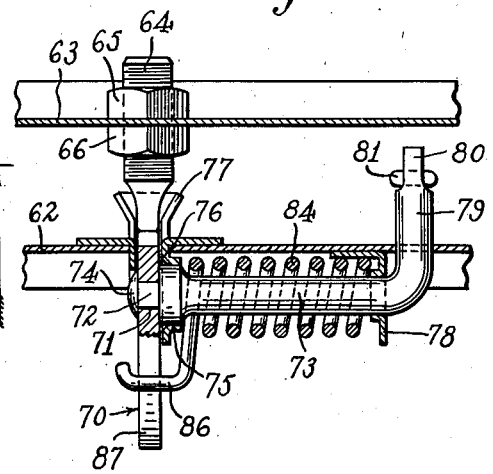

Figs. 7 and 8 are sections on lines 7—7 and 8—8, respectively of Fig. 6;

Fig. 9 is a view similar to Fig. 6 showing the hood lifted to a slight extent, and Figs. 10 and 11 are, respectively, sections on line 10—10 of Fig. 7 and line 11—11 of Fig. 10.

In the drawings I have shown for illustrative purposes a hood control device in which the hood proper is of the lid type and is liftable from the front end of the car, this hood being equipped with a latching member in the form of a keeper depending from an upper plate carried by the hood. The lower fixed part of the hood structure or enclosure is provided with a stationary plate, and upon this plate is mounted a detent or holding member movable to engage or to release the keeper, the movement of the detent being effected from the driver's seat through the manipulation of a suitable device such as an operating lever in convenient position near the driver. Means are also provided for limiting the upward swing of the hood and maintaining it under control after the hood latch has been released from the remotely situated operating device, either intentionally or otherwise. Also, in the form shown in Figs. 1 to 5, inclusive, I have provided a visual indicating device which is shiftable automatically as the hood latch is released, so as to indicate to the attendant, as above mentioned, that service is desired.

In the drawings, the lower or fixed part of the hood enclosure or casing is shown at 20, and the hood or lid is shown at 21. Within the lower casing is a fixed plate 22, and within the hood and liftable therewith is an upper plate 23. The upper plate carries a depending keeper member 24 which, as the hood is closed, is moved downwardly into cooperation with the lower plate, and mounted on the lower plate is a detent or holding member 25 which in one position has such cooperation with keeper 24 as to hold the hood in the closed position. The detent device 25 is operable from a remote point, for example, a point adjacent the driver's seat, by suitable means such as an operating lever 26 connected to detent device 25 by means such as a cable 27. Associated with the detent member 25 is a swinging member 28 adapted to act as a safety catch in the manner hereinafter described. In this particular form also, that is, the form of Figs. 1 to 5, inclusive, an indicating member for signalling the attendant is employed, and in this particular instance the indicator is constituted by an arm 29 located at the front end of the hood and connected to the catch member 28.

Referring now to the details, it will be seen that the lower plate 22 extends across the lower casing member 20 at the upper part thereof, somewhat below the upper margin of said member. The upper plate 23 extends across the hood 21 in a region somewhat above the lower margin of the hood. The upper plate is somewhat offset relatively to the lower plate so as to position it somewhat farther to the rear. The keeper 24, previously mentioned, is arranged in depending position adjacent the middle portion of the upper plate and is fixed to the upper plate in a suitable manner so as to be rigid therewith. In the form shown, the keeper is provided with a threaded shank 30 extending upwardly through a hole in the upper plate. This shank engages a threaded socket member 31 associated with the upper face of the plate, and at the lower face of the plate a lock nut 32 is employed.

At its lower part the keeper 24 is provided with a flattened portion in the nature of a blade bent to give it a hook-shaped formation. The hook of the keeper is disposed in a substantially vertical plane and extends forwardly so that the free extremity is at the front, and this extremity is preferably formed as a squared-off edge portion 33. In the closed position of the hood this squared-off extremity 33 lies at an angle to a horizontal plane, as shown in Fig. 4, and in this position it is adapted to cooperate with a portion of the detent device 25 in the manner hereinafter described.

Figure 4:
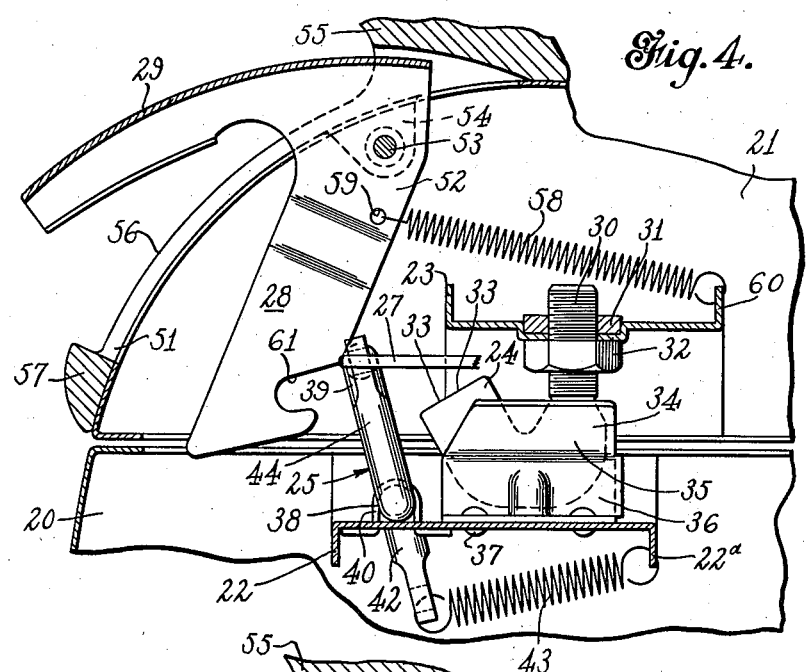
Fig. 4 is an enlarged sectional view of certain parts shown in Fig. 1, showing the rocking rod swung to a position in which it releases the keeper and shifts the swinging catch and indicator device.
Figure 5:
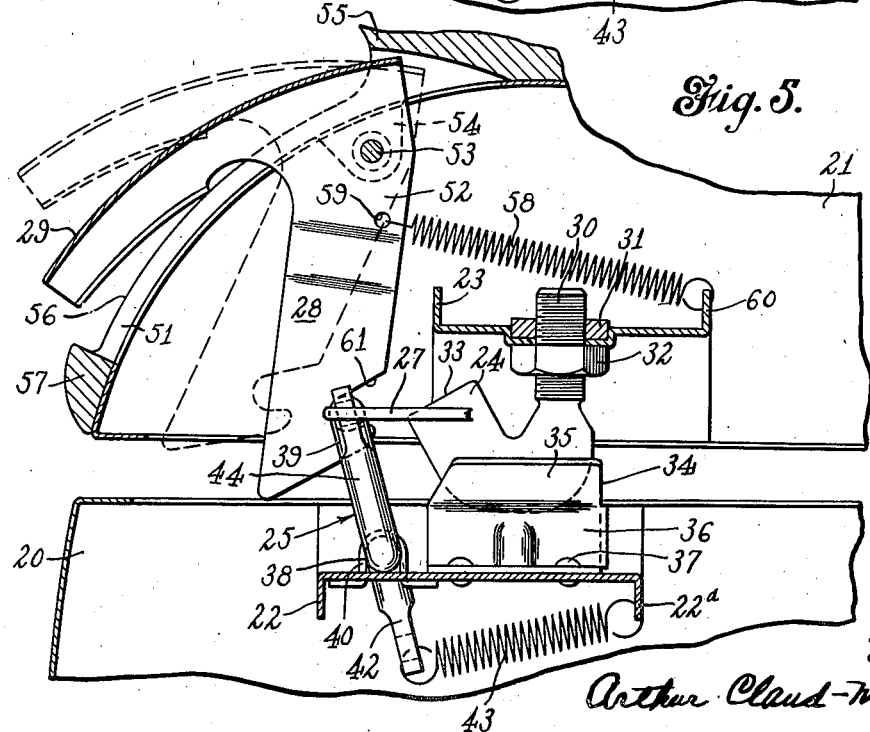
Fig. 5 is a view similar to Fig. 4 showing how the catch acts as a safety device, limiting the upward swing of the hood.

In order to guide the keeper head to the position shown in Fig. 4, the lower plate is provided with upstanding lips 34, preferably having the formation shown in Fig. 3, and presenting upper downwardly converging centering and guiding portions 35, and lower cheek portions 36 between which in the closed position the lower part of the keeper is closely confined. The lips 34 can be secured to the lower plate by means such as rivets 37.

The detent device 25 is preferably in the form of a rod 38 rockably mounted on the upper surface of plate 22, and having an intermediate swinging crank portion 39 adapted to extend over the free end of the keeper in order to hold the hood in the closed position. It will be seen that the rod 38 extends longitudinally of plate 22 at the upper surface thereof, and has adjacent the end portions rocking bearings provided by means such as the clips 40. At one end the rod is bent down and passes through a slot 41 in the plate, and the rod extremity or depending arm portion 42 has connected to it one end of a helical spring 43, the opposite end of said spring being connected to the rear flange 22ª of the plate. Normally this spring 43 holds the rod 38 in the position of Fig. 4.

At the opposite end of the rod 38 the same is provided with an upwardly bent arm 44, and to the extremity of this arm the cable 27 is connected. The rear end of the cable 27 is connected to a link 45 sliding through a partition 46 between the engine space and the interior of the car. At a point within the car the link 45 has a downwardly turned end 47 connected by a pivot 48 to an arm 49 projecting rearwardly from lever 26. The lever 26 is pivoted intermediate of its ends on a pivot 50, and the arm 49 is to the rear of this pivot. In the closed position of the hood the pivot 48 is located slightly below pivot 50 so that by an action in the nature of a toggle action the cable 27 is held in a position in which the crank portion 39 of lever 38 lies over and against the free end of the keeper, in opposition to the action of spring 43.

Although it is not necessary that the safety catch member 28 and the signal arm 29 be part of the same structure I have shown for illustrative purposes a structure in which a single lever of V-shaped formation combines these two functions, being provided with one arm which acts as a safety catch and another arm which acts as a signal or indicator. In this particular case the V-shaped lever is made of sheet metal having a two-ply depending arm structure providing the safety catch 28, previously mentioned. The other arm of the lever, which provides the signal device 29, is in this particular case of hollow formation, operating in a cut-out portion or opening 51 in the front part of the hood. Adjacent the point where the two arms of the lever come together, the lever has laterally spaced cheeks 52, best shown in Fig. 3, and through these cheeks passes a pin 53 by means of which the lever is mounted to swing in a vertical plane. The pivot pin 53 passes through lugs 54 formed in a die casting 55 that may be applied to the hood as an ornamental feature, and this casting may have a portion 56 creating a slot in which the arm 29 in one of its positions may be disposed. The slot like opening for the arm 29 may be bounded to an extent by a part 57 at the lower end of member 55.

A helical spring 58 hooked at one end in a hole 59 in arm 28 has its opposite end hooked to the rear flange 60 of the upper plate. This spring 58 normally holds the lever 28, 29 in the position shown in Fig. 1, with the arm 29 in its hood recess.

In order that arm 28 may act as a safety catch to prevent more than limited lifting of the hood except when it is the intention to raise the hood, this arm is caused to cooperate with a portion of the detent rod, and in the particular form shown the arm 28 is provided at the lower rear part with an inclined notch 61 adapted to be engaged by the crank portion 39. When the hood is in the closed position this notch 61 is located close to and in front of the connecting portion of the crank part of the rod.

Assuming that the parts are in the closed and latched position shown in Fig. 1, and it is desired, say, to have the motor oil checked, the driver manipulates the lever 26 from the position shown in full lines in Fig. 1 to the position shown in dotted lines. By this movement the cable 27 is released, and the detent device 25 permitted to swing on its rocking axis under the influence of spring 43. This causes the crank portion of the rod to be moved forwardly from its position over the end of the hook-shaped keeper to a keeper releasing position such as shown in Fig. 4, and in moving to this position the rod engages the lever 28, 29 and shifts it to the position shown in Fig. 4, in which position arm 29 is raised upwardly out of its seat to a projecting position, being held in that position by the rod against the action of spring 58. The projecting position of arm 29 will indicate to the attendant that service is desired, and the attendant can then by grasping the arm 29, which is in a forwardly projecting position, readily raise the hood to its fully open position, leaving the detent rod in the position shown in Fig. 4, in which position it is held by engagement of rod extremity 42 with one end of slot 41.

When the detent has been moved to the position shown in Fig. 4, by intention or otherwise, the arm 28 acts as a safety device. If, for example, there is a tendency for a gust of wind to raise the hood, its upward movement will cause the notch 61 to engage the crank portion of the rod in the manner shown in full lines in Fig. 5. The safety catch can, however, be readily released from the exterior of the car, without the need of inserting the hand between the hood and the lower casing because the arm 29 is readily available for manipulation from the exterior.

When the hood is closed again from the fully opened position, the hook-shaped end of the keeper enters between the guiding lips of the lower plate, and the lever 26 is manipulated so as to swing the detent rod to the latching position, in which position it is held by the over-center position lever 26. This latching operation takes place in opposition to the action of spring 43, which is thereby energized.

The described construction is very simple and compact and can be inexpensively manufactured, and yet it is very effective in its functioning and provides means for controlling in an effective and convenient way the latching and unlatching of the hood and the checking of the hood against inadvertent opening. Furthermore, the indicator or signalling device for signalling the station attendant provides a very desirable feature, facilitating the servicing of the car. In this particular case also the movable indicator device permits manipulation of the safety catch from the exterior of the hood. Yet, notwithstanding these desirable features, the cost of the device is low.

In the form shown in Figs. 6 to 11, inclusive, there is a remote control of the hood-latching means generally similar to that previously described. In this case, also, a device such as the lever 26, previously described, is used in the operation of latching and releasing the hood. The safety catch, however, is different, and the indicating or signalling feature is omitted.

In this alternative form the lower plate is shown at 62 and the upper plate at 63. The upper plate carries a depending keeper, but this keeper is of somewhat different form from the one previously described. It has a shank 64 adjustably held in place by nuts 65 and 66. The head 67 of the keeper is flattened and of knife blade formation and has a lower forwardly directed extension 68 presenting an upwardly facing shoulder 69. This shoulder is adapted to be engaged by a swinging detent, which in this particular case is generally in the form of a rockable crescent-shaped plate 70, as shown in Fig. 10. This crescent-shaped or angular plate 70 has a slot 71 therein by means of which it is mounted non-rotatably on a portion 72 of a rocking rod or shaft 73. At one end a rivet 74 clinches the plate to this shaft. The shaft 73 is arranged beneath plate 62 and directed generally lengthwise thereof, and adjacent one end has a bearing 75 carried by a sheet metal structure 76 that acts to center and guide the keeper head 67, for which purpose the structure 76 has upwardly projecting lips 77. Adjacent the opposite end of shaft 73 the same has a bearing in a bracket member 78, which may be welded to the under surface of plate 62. At its extremity, adjacent bearing plate 78, shaft or rod 73 is turned upwardly, as shown in Fig. 8, to provide an arm 79, which extends upwardly through a slot in plate 62. This arm 79 has its upper extremity 80 connected to a cable 81 which is similar to cable 27 previously described, and is controlled in the same manner, or in a similar manner, such that when the cable is held in the rearward position, as indicated in Fig. 6, the keeper will be engaged and held by the plate-like detent 70. In this position, the upper arm 82 of the detent, which is provided with a straight lower edge 83, has said edge engaged over the upper edge of the extension 68, as shown in Fig. 10.

The detent plate 70 is normally held in the position shown in Fig. 9 by means such as a coil spring 84 coiled about shaft 73 between the shaft bearings, one end of this spring being engaged with a stationary part of the lower supporting plate structure and the other end being continued to form a controlling arm 86 extending over and bearing against the arm 87 of plate 70. This arm 87 has a rounded free extremity 88, adapted in one position to engage the lower edge of the keeper head, as indicated by the dotted lines in Fig. 9.

The safety device for preventing full upward movement of the hood at times and under circumstances when that is not desired, may take the form of a catch lever 89, pivoted to the front edge portion of the lower plate, as indicated at 90, and having an upper hooked end 91 adapted to hook over a flange 92 at the front edge of the upper plate. In association with this safety catch or lever is a spring 93 normally holding the hook in cooperation with the upper plate. However, after the hood has been slightly raised, the operator can insert his hand to engage a pad 94 at the lower end of the safety catch for the purpose of swinging the catch to the inoperative position. This construction of safety catch is, however, shown only by way of example.

Assuming that the hood is in the closed position, as shown in Fig. 6, and that it is desired to open the same, the driver manipulates his operating lever, similar to lever 26 previously described, so as to release the cable 81. The detent shaft or rod 73 is then free to shift to the position shown in Fig. 9 under the influence of its controlling spring 84. This spring moves the detent plate 70 in a counterclockwise direction from the position shown in Fig. 6 to the position shown in Fig. 9, and the upper part of the detent plate is, therefore, moved to disengage and release the keeper. As the detent plate is moved in this way, its lower arm 87 is moved so that its rounded end portion 88 engages the lower end of the keeper, and therefore the keeper is moved up to the position shown in Fig. 9, carrying with it the hood and its associated parts. Thus the hood is opened to the position shown in Fig. 9, in which position the operator has sufficient access to the safety catch 89 to manipulate the same.

In rotating counter-clockwise to the position shown in Fig. 9, the detent plate is arrested in the position shown in Fig. 9 by the engagement of the arm 82 with a part 95 of the lower plate (Fig. 10). In the position shown in Fig. 9, where the hood has been opened to a slight extent by spring action on the lower end of the keeper, and where the keeper rests in a yielding manner on an arm of the detent, the lower edge of the keeper head is slightly below the plane of the plate 62, but variation may be made in this and other respects.

It will be understood that when the hood is moved from the fully opened position to the closed position, the keeper head will be forced down between the lips 77 and forced home, and this will cause the detent plate to be swung in a clockwise direction to a certain extent (Fig. 9). The detent rod, by being rocked by a rearward pull on the cable 81, can be caused to engage the detent plate with the keeper to latch the hood, and if the keeper is not forced home the upper arm of the detent plate will engage it to force it home.

I do not claim broadly herein the combination in a hood control device of a depending fixed latching member carried by an upper hood member and provided with a lower latching head, a swinging detent member carried by the lower fixed part of the engine enclosure and adapted to extend over said latching head to latch the hood, a spring urging said detent member toward latching head releasing position, and means including an operating lever movable to an over-center position for moving the detent member in opposition to said spring to hood-latching position, as claimed in my divisional application Serial No. 416,510, filed October 25, 1941.

While I have shown two forms of hood control device embodying my invention, it will be understood that the invention can take various other forms, and that various modifications and changes in the organization of parts and in the details may be made without departing from the principles of the invention or the scope of the claims.

What I claim is:

1. In a hood control device, the combination of a lower casing part, a liftable hood, plates carried by the casing part and hood respectively, the hood plate having a depending keeper, a rocking rod carried by the lower plate having a portion adapted to overlie a part of the keeper to hold the hood in the closed position, and a safety catch member movably carried by the hood and with which said rocking rod cooperates to limit the opening of the hood.

2. In a hood control device, the combination of a lower casing part, a liftable hood, plates carried by the casing part and hood respectively, the hood plate having a depending keeper, a rocking rod carried by the lower plate having a portion adapted to overlie a part of the keeper to hold the hood in the closed position, and a safety catch member swingingly carried by the hood and with which said rocking rod cooperates to limit the opening of the hood, said safety catch member having a notch adapted to receive a portion of said rocking rod.

3. In a hood control device, the combination of a lower casing part, a liftable hood, plates carried by the casing part and hood respectively, the hood plate having a depending keeper, a rocking rod carried by the lower plate having a portion adapted to overlie a part of the keeper to hold the hood in the closed position, and a safety catch member carried by the hood and with which said rocking rod cooperates to limit the opening of the hood, said safety catch member having a notch adapted to receive a portion of said rocking rod, said safety catch member also having an exteriorly projectible part movable by the rocking rod to act as a signal.

4. In a hood control device, a fixed casing part, a liftable hood, supporting plates carried respectively by said parts, the hood plate having a depending keeper, a remotely operable detent carried by the other plate adapted to engage and hold the keeper, means normally holding the detent in keeper releasing position, and a pivoted safety catch member adapted to cooperate with the detent when the keeper is released.

5. In a hood control device, a fixed casing part, a liftable hood, supporting plates carried respectively by said parts, the hood plate having a depending keeper, a remotely operable detent carried by the other plate adapted to engage and hold the keeper, means normally holding the detent in keeper releasing position, a pivoted safety catch member adapted to cooperate with the detent when the keeper is released, and an exteriorly visible signal member moving with the safety catch member.

6. In a hood control device, a fixed casing part, a liftable hood, supporting plates carried respectively by said parts, the hood plate having a depending keeper, a remotely operable detent carried by the other plate adapted to engage and hold the keeper, means normally holding the detent in keeper releasing position, a pivoted safety catch member adapted to cooperate with the detent when the keeper is released, and an exteriorly visible signal member moving with the safety catch member, the detent when released being operable to shift the safety catch member and move the signal member.

7. In a hood control device for motor cars in which a liftable hood member carries a fixed depending keeper having a lower latching head and a swinging detent adapted to extend over said latching head to latch the hood is carried by the lower fixed part of the engine enclosure, a swinging detent movable to overlie the latching head, a spring urging said detent member toward hood-releasing position, a movable signal carried by the hood having an externally projectible part to signal the release of the hood, said detent member including a part serving to operate said signal as the hood is released, and means operable from a distance for overcoming the action of said spring and latching the hood in closed position.

8. In a hood control device for use in connection with a hood structure having relatively movable upper and lower members, said members being provided within the hood structure with plates adapted to be latched together, a safety catch member for limiting the opening movement of the upper hood member mounted within said upper member and provided with a portion projectible out of the upper portion of said upper member by means of which said safety catch member can be manipulated from the exterior of the hood, and a latching part movably mounted on the lower plate with which said safety catch member cooperates.

9. In a hood control device for use in connection with a hood structure having a lower casing part, a liftable hood, and plates carried by the casing part and hood respectively, the hood plate carrying at its under portion a depending keeper, a rocking rod carried by the lower plate having a portion adapted to overlie a part of the keeper to latch the hood, and a movable member carried by the hood and accessible from the top of the hood cooperating with said rocking rod to provide a safety catch permitting the hood to be lifted to a limited degree only.

10. In a hood control device for use in connection with a hood structure having a lower casing part, a liftable hood, and plates carried by the casing part and hood respectively, the hood plate being provided at its under portion with a depending keeper, a rocking rod carried by the lower plate having a portion adapted to overlie a part of the keeper to latch the hood, a projecting signal device, and means associated with the rocking rod to operate the signal device when the hood is released.

11. In a hood control device for use in connection with a hood structure having a lower casing part, a liftable hood and plates carried by the casing part and hood respectively, the hood plate having at its under portion a depending keeper with an upwardly facing shoulder, a rocking rod carried by the lower plate having a crank-like portion adapted to overlie a part of the keeper to latch the hood, and a safety catch member carried by the hood at one side of the keeper cooperating with said crank-like portion of the rocking rod.

12. In a hood control device for motor cars in which a liftable hood member hinged at the rear carries a rigid depending keeper and in which the fixed lower part of the hood enclosure is provided with a movable detent member cooperating with said keeper to latch the hood, a depending keeper on the liftable hood member adjacent the front end thereof having a hook-shaped forwardly disposed lower portion providing an upwardly facing shoulder, a movable detent member on the lower fixed part comprising a rocking rod disposed in front of said keeper member and having an integral crank-like portion adapted to overlie said shoulder to latch the hood, a pull member operable from the interior of the car for moving said rocking rod in the hood-closing direction, an operating lever connected to said pull member adapted to be moved to an over-center position, and a spring active to hold said lever in the over-center position.

13. In a hood control device for a hood structure having a lower casing part, a liftable hood and plates within the hood structure mounted on the casing part and hood respectively, means for latching said plates together, operating means for said last means operable only from the interior of the car, a movable signal member having a part projectible to the exterior of the hood structure, and means associated with the latching means for moving said signal member upon the release of said latching means.

14. In a hood control device for a hood structure having a lower casing part, an upper pivoted hood, and means releasable only from the interior of the car for latching the hood to the lower casing part, a movable member operably associated with said latching means having a signaling part projectible from the hood adjacent an edge remote from the hood pivot by and upon the release of said latching means.

15. In a hood control device for motor cars, fixed and movable members of an engine enclosure, means releasable from a distance for latching said members together, exteriorly visible means associated with the engine enclosure for signaling to the station attendant the release of the latching means, and means of connection between the latching means and the signaling means whereby the latter is operated to give a signal.

16. In a hood control device, fixed and movable members of an engine enclosure, means releasable from a distance for latching said members together, means comprising a signal arm associated with the hood enclosure for signaling the release of the latching means, and means of connection between said latching means and said signaling means whereby said signal arm is operated.

17. In a hood control device, fixed and movable members of an engine enclosure, mechanism releasable from the interior of the car for latching said members together, a combined safety catch and signal device having means to limit the separation of the fixed and movable members and also having as a part thereof a signal element associated with the movable member adapted to be shifted to an exteriorly projecting position for giving a signal to the station attendant, and means of connection between said latching mechanism and said combined safety catch and signal device whereby the signal is given upon the release of the latch mechanism.

18. In a hood control device for motor cars in which a liftable hood carries a fixed depending keeper having a lower latching head and a swinging detent member is movably mounted on the lower fixed part of the engine enclosure and is adapted to overlie said latching head to latch the hood, a swinging detent member movable in a vertical plane, a spring urging said detent member toward hood-releasing position, a safety catch for the hood which is moved by said detent member when the hood is released to a position in which the safety catch cooperating directly with the detent member allows a limited lifting movement only of the hood, said catch member having manual manipulation means accessible from the exterior of the hood by means of which the catch member can be moved to releasing position to permit full opening of the hood, and means operable from the car interior for overcoming the action of said spring and latching the hood in closed position.

ARTHUR CLAUD-MANTLE.